(12) United States Patent
Kim et al.

(10) Patent No.: US 10,274,780 B2
(45) Date of Patent: Apr. 30, 2019

(54) LIQUID CRYSTAL DISPLAY

(71) Applicant: Samsung Display Co., Ltd., Yongin, Gyeonggi-Do (KR)

(72) Inventors: Won Ho Kim, Seongnam-si (KR); Tae Hyung Hwang, Seoul (KR); Young Jin Park, Suwon-si (KR); Seong Su Lim, Seoul (KR); Young Je Cho, Asan-si (KR)

(73) Assignee: SAMSUNG DISPLAY CO., LTD., Gyeonggi-do (KR)

( * ) Notice: Subject to any disclaimer, the term of this patent is extended or adjusted under 35 U.S.C. 154(b) by 900 days.

(21) Appl. No.: 14/264,865

(22) Filed: Apr. 29, 2014

(65) Prior Publication Data
US 2015/0131037 A1 May 14, 2015

(30) Foreign Application Priority Data
Nov. 13, 2013 (KR) .................. 10-2013-0137826

(51) Int. Cl.
*G02F 1/00* (2006.01)
*G02F 1/1335* (2006.01)
*G02F 1/1343* (2006.01)

(52) U.S. Cl.
CPC ...... *G02F 1/133528* (2013.01); *G02F 1/0045* (2013.01); *G02F 1/134336* (2013.01); *G02F 2001/133531* (2013.01); *G02F 2201/123* (2013.01)

(58) Field of Classification Search
CPC ............ G02F 1/133528; G02F 1/0045; G02F 1/134336; G02F 2001/133531; G02F 2201/123

USPC .................................................. 349/129, 141
See application file for complete search history.

(56) References Cited

U.S. PATENT DOCUMENTS

| 6,636,289 B2 | 10/2003 | Yoo et al. |
| 7,583,345 B2 | 9/2009 | Song et al. |
| 8,400,603 B2 | 3/2013 | Yoso et al. |

(Continued)

FOREIGN PATENT DOCUMENTS

| JP | 2008191645 A | 8/2008 |
| JP | 2010164728 A | 7/2010 |

(Continued)

OTHER PUBLICATIONS

Kim, H., et al., "Color characteristics of the fringe-field switching liquid crystal mode depending on E- and O-modes"; Current Applied Physics 7 ; pp. 160-167; 2007.

*Primary Examiner* — Edward J Glick
*Assistant Examiner* — David Y Chung
(74) *Attorney, Agent, or Firm* — Cantor Colburn LLP

(57) ABSTRACT

A liquid crystal display according to an exemplary embodiment of the invention includes: a first type pixel including first liquid crystal molecules aligned approximately in a first direction; a second type pixel including second liquid crystal molecules aligned approximately in a second direction different from the first direction; a first lower polarizer disposed opposite to the first type pixel and having a transmissive axis approximately parallel to the first direction; and a second lower polarizer disposed opposite to the second type pixel and having a transmissive axis approximately parallel to the second direction.

9 Claims, 15 Drawing Sheets

(56) References Cited

U.S. PATENT DOCUMENTS

| | | | | |
|---|---|---|---|---|
| 2003/0218705 | A1* | 11/2003 | Lee | G02F 1/133512 349/106 |
| 2006/0001798 | A1* | 1/2006 | Jang | G02F 1/133528 349/96 |
| 2009/0086142 | A1* | 4/2009 | Chen | G02F 1/133753 349/129 |
| 2011/0037928 | A1* | 2/2011 | Little | G02B 5/3058 349/96 |
| 2011/0317118 | A1* | 12/2011 | Okazaki | G02F 1/1393 349/141 |
| 2013/0088667 | A1* | 4/2013 | Kong | G02F 1/133528 349/96 |
| 2013/0188106 | A1* | 7/2013 | Nishida | G02F 1/133512 349/33 |
| 2015/0153495 | A1* | 6/2015 | Matsuda | G02B 5/3016 349/194 |

FOREIGN PATENT DOCUMENTS

| | | |
|---|---|---|
| JP | 2011043726 A | 3/2011 |
| JP | 2013137488 A | 7/2013 |
| KR | 100683139 | 2/2007 |
| KR | 1020090036870 A | 4/2009 |
| KR | 1020090125326 A | 12/2009 |
| KR | 1020100097864 A | 9/2010 |
| KR | 1020110008365 A | 1/2011 |

\* cited by examiner

LIQUID CRYSTAL DISPLAY

This application claims priority to Korean Patent Application No. 10-2013-0137826 filed on Nov. 13, 2013, and all the benefits accruing therefrom under 35 U.S.C. § 119, the contents of which are incorporated by reference herein in its entirety.

BACKGROUND (a) Field

Exemplary embodiments of the invention relate to a liquid crystal display, and in detail, relate to a liquid crystal display with improved transmittance and viewing angle characteristics.

(b) Description of the Related Art

A liquid crystal display is one of the most widely used types of flat panel display. The liquid crystal display typically includes two display panel sheets, in which field generating electrodes such as pixel electrodes and common electrodes are provided, and a liquid crystal layer interposed between the display panels. In such a liquid crystal display, a voltage is applied to the field generating electrodes to generate an electric field in the liquid crystal layer, which determines the direction of liquid crystal molecules of the liquid crystal layer, and an image is displayed by controlling the polarization of incident light. Transmittance of the liquid crystal display may be increased when the liquid crystal molecules are properly controlled.

Each pixel electrode of the liquid crystal display is connected to switching devices that are connected to signal lines such as gate lines and data lines, etc. The switching device, which is typically a three-terminal device of a thin film transistor, etc., transfers a data voltage to a pixel electrode through an output terminal.

In such a liquid crystal display, the pixel electrode and the common electrode for generating the electric field to the liquid crystal layer may be provided on a same display panel on which the switching device is provided. One of the pixel electrode and the common electrode of the liquid crystal display includes a plurality of branch electrodes, and the other of the pixel electrode and the common electrode may have a plane shape. When the inclined directions of the liquid crystal molecules positioned at the edge of the branches overlap each other, texture may be generated.

SUMMARY

Exemplary embodiments of the invention provide a liquid crystal display with improved viewing angle and increased transmittance of the liquid crystal display.

In an exemplary embodiment of a liquid crystal display, according to the invention, includes: a first type pixel including first liquid crystal molecules aligned approximately in a first direction; a second type pixel including second liquid crystal molecules aligned approximately in a second direction different from the first direction; a first lower polarizer disposed opposite to the first type pixel and having a transmissive axis approximately parallel to the first direction; and a second lower polarizer disposed opposite to the second type pixel and having a transmissive axis approximately parallel to the second direction.

In an exemplary embodiment, the first type pixel may further include a first field generating electrode, where the first field generating electrode includes a plurality of first branch electrodes approximately parallel to the first direction or inclined in a direction forming an acute angle with the first direction, and the second type pixel may include a second field generating electrode, where the second field generating electrode includes a plurality of second branch electrodes approximately parallel to the second direction or inclined in a direction forming an acute angle with the second direction.

In an exemplary embodiment, the first lower polarizer may include a plurality of minute patterns extending in a direction approximately perpendicular to the first direction, and the second lower polarizer may include a plurality of minute patterns extending in a direction approximately perpendicular to the second direction.

In an exemplary embodiment, each of the first type pixel and the second type pixel may further include a first substrate and a second substrate, which are disposed opposite to each other via the first liquid crystal molecules and the second liquid crystal molecules interposed therebetween, and each of the first lower polarizer and the second lower polarizer may be disposed on or under the first substrate.

In an exemplary embodiment, the first field generating electrode and the second field generating electrode may be disposed on the first substrate, and the liquid crystal display may further include a third field generating electrode disposed on the first substrate, in a different layer from the first or second field generating electrode, and overlapping the plurality of first or second branch electrodes.

In an exemplary embodiment, the liquid crystal display may further include a first upper polarizer disposed opposite to the first type pixel and having a transmissive axis approximately parallel to the second direction, and a second upper polarizer disposed opposite to the second type pixel and having a transmissive axis approximately parallel to the first direction.

In an exemplary embodiment, the liquid crystal display may further include a plurality of pixels including a plurality of first type pixels and a plurality of second type pixels may be further included, and the first type pixels and the second type pixels may be alternately arranged with each other in at least one direction of the first direction and the second direction.

In an exemplary embodiment, the liquid crystal display may further include a plurality of pixels, each of which receives an input signal and displays an image corresponding to the input image signal, where each pixel may include the first type pixel and the second type pixel as first and second subpixels thereof, which receive a same input signal as each other.

In an exemplary embodiment, the first type pixel and the second type pixel in each pixel may display images corresponding to the same input signal based on different gamma curves from each other.

In an exemplary embodiment, the first field generating electrode and the second field generating electrode may be disposed on the first substrate, and the liquid crystal display may further include a third field generating electrode disposed on the first substrate, in a same layer as the first or second field generating electrode, and including a plurality of third branch electrodes alternately disposed with the plurality of first or second branch electrodes.

According to exemplary embodiments of the invention, the viewing angle characteristic of the liquid crystal display may be improved while increasing the transmittance of the liquid crystal display.

BRIEF DESCRIPTION OF THE DRAWINGS

The above and other features of the invention will become more apparent by describing in detailed exemplary embodiments thereof with reference to the accompanying drawings, in which.

DETAILED DESCRIPTION

Figure 1:
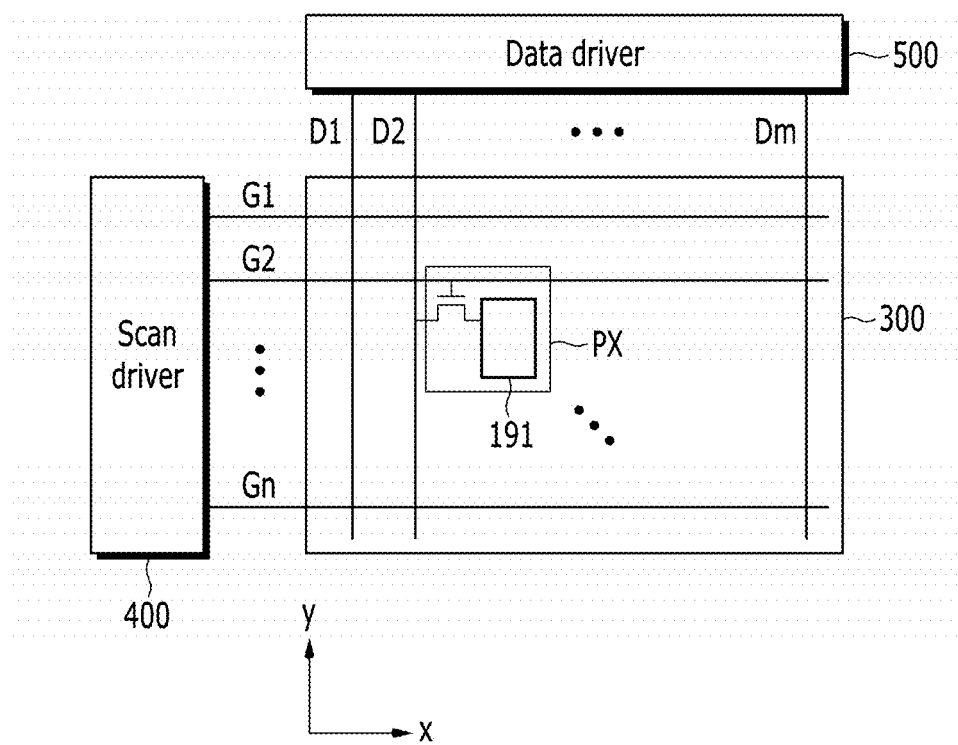
FIG. 1 is a block diagram of an exemplary embodiment of a liquid crystal display according to the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

Now, exemplary embodiments of a liquid crystal display according to the invention will be described in detail with reference to the accompanying drawings.

Firstly, an exemplary embodiment of a liquid crystal display according to the invention will be described with reference to FIG. 1 to FIG. 8.

Figure 2:
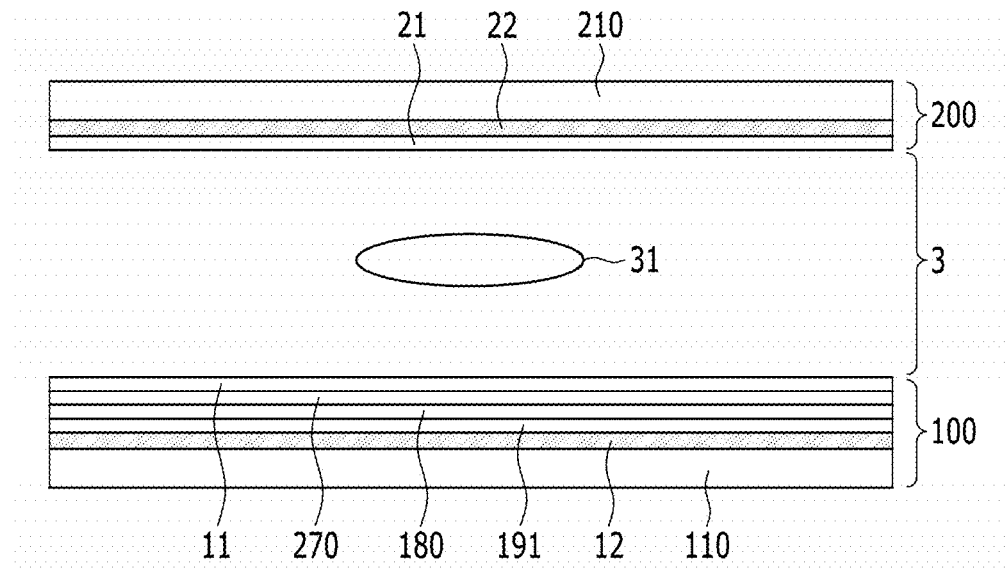
FIG. 2 is a cross-sectional view of an exemplary embodiment of a liquid crystal display according to the invention.
Figure 3:
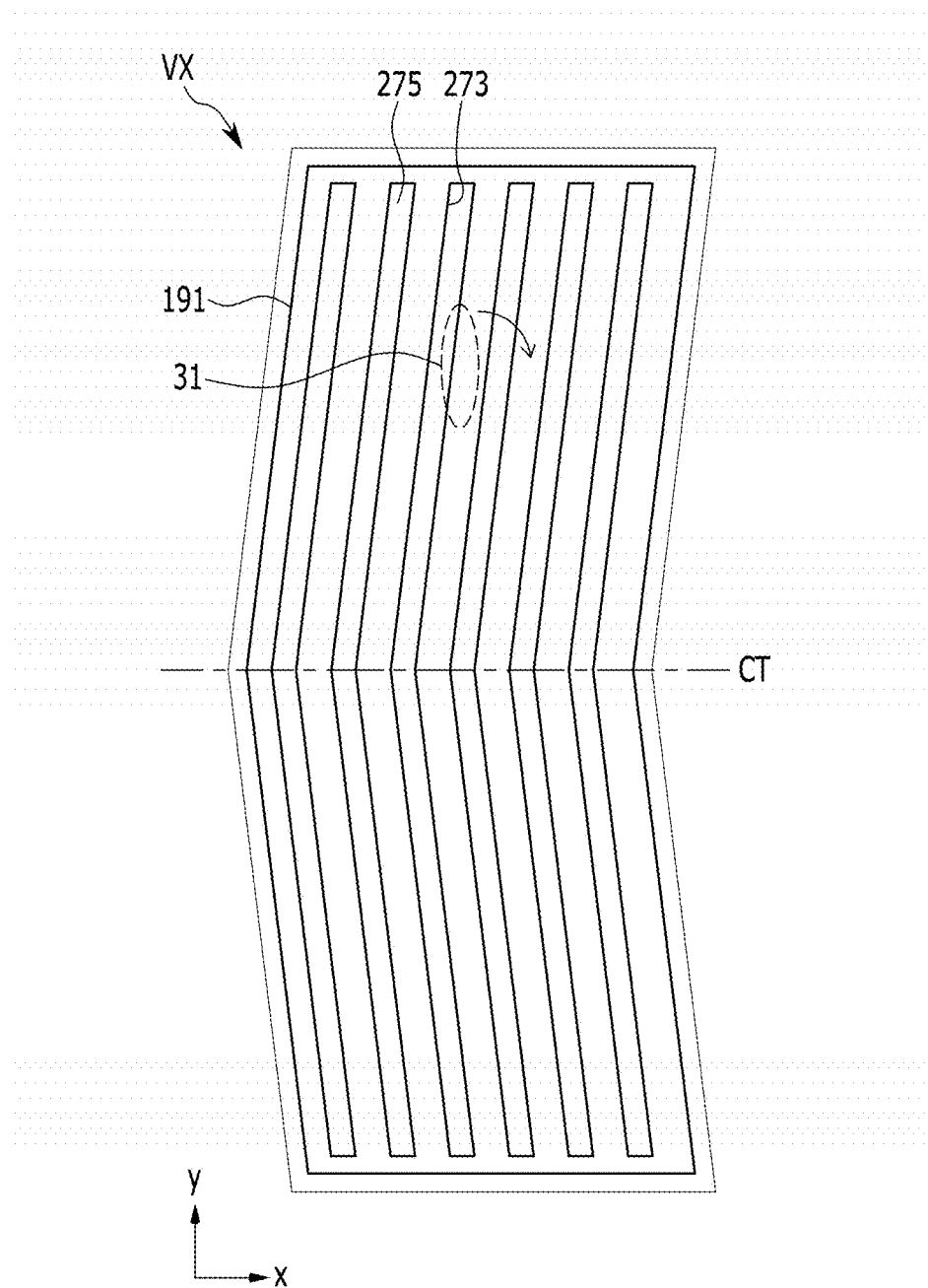
FIG. 3 is a top plan view of an exemplary embodiment of a field generating electrode in a pixel of a liquid crystal display, according to the invention.
Figure 4:
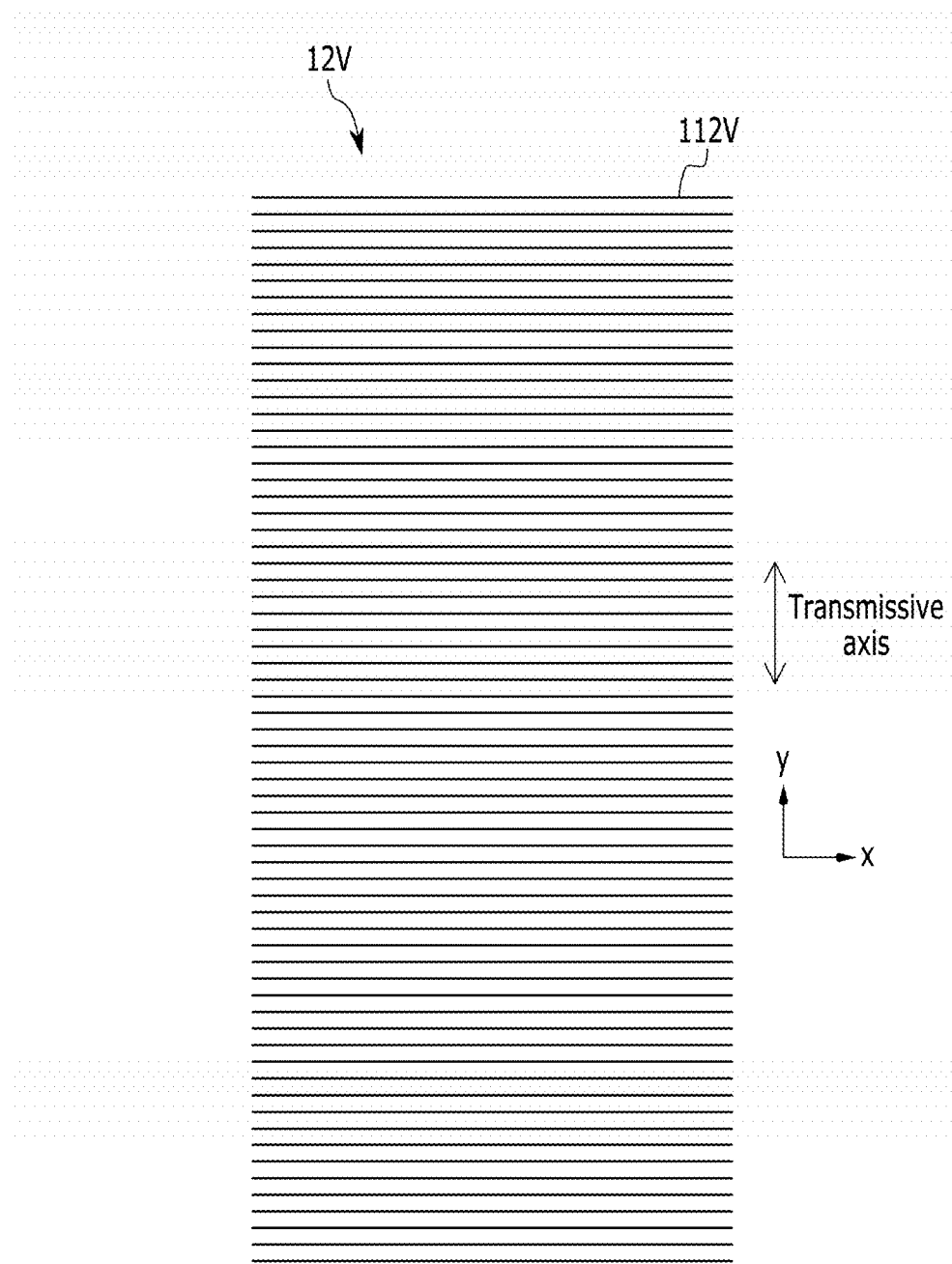
FIG. 4 is a top plan view of a lower polarizer facing the pixel of FIG. 3.
Figure 5:
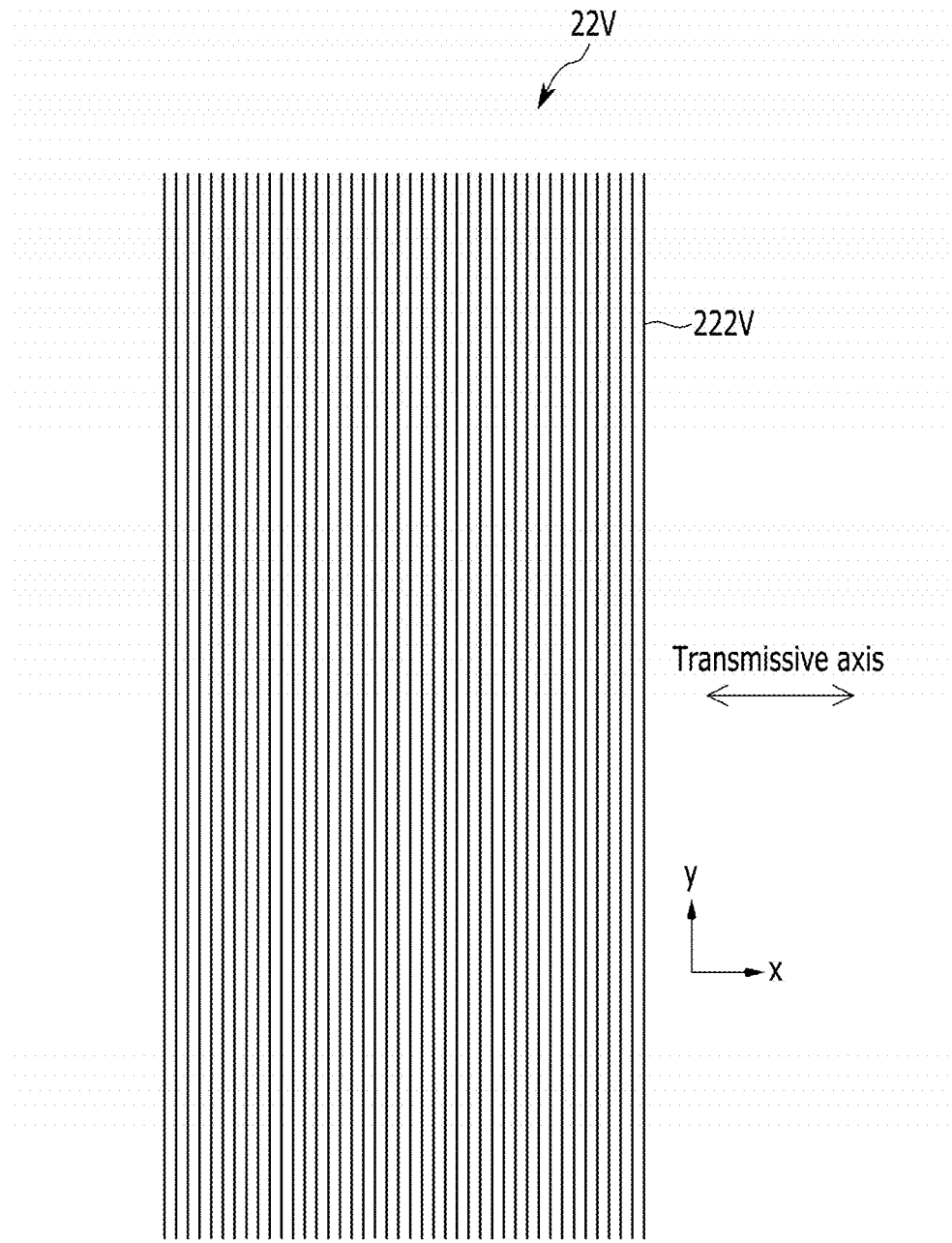
FIG. 5 is a top plan view of an upper polarizer facing the pixel of FIG. 3.
Figure 6:
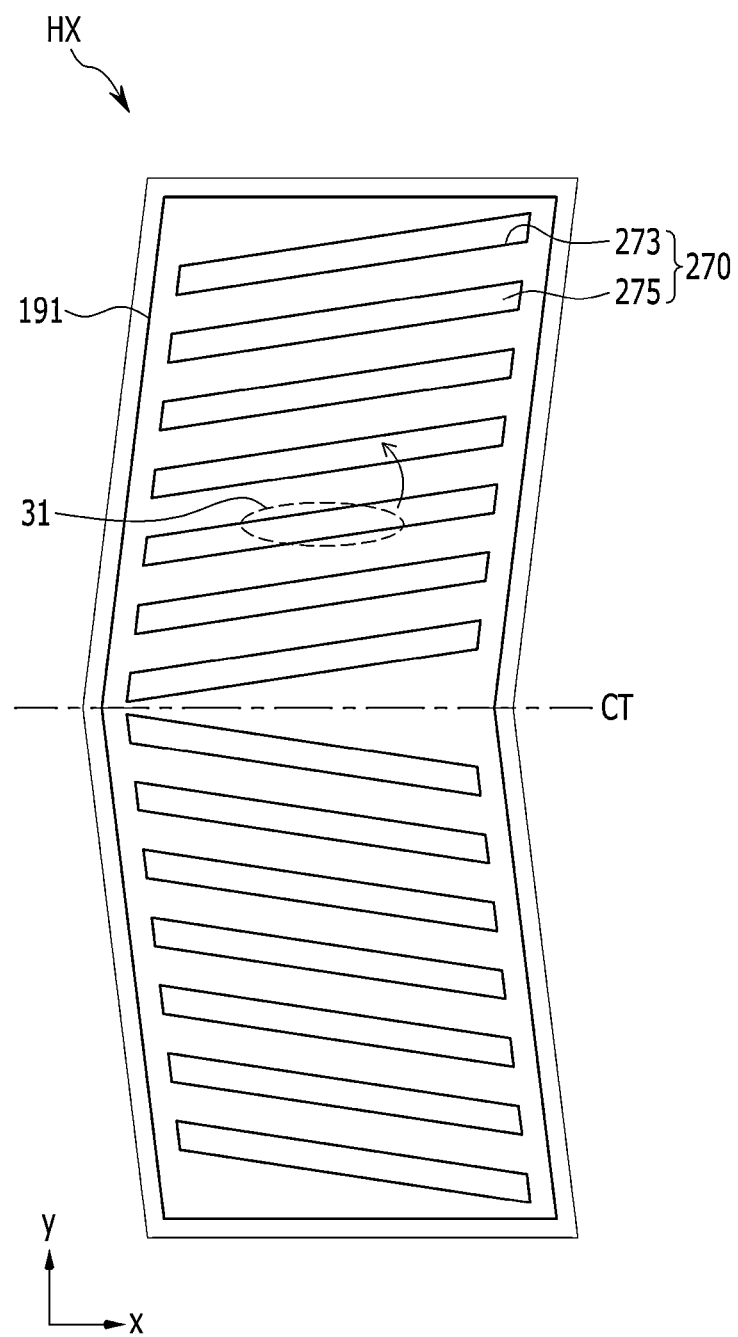
FIG. 6 is a top plan view of an exemplary embodiment of a field generating electrode in a pixel of a liquid crystal display, according to the invention.
Figure 7:
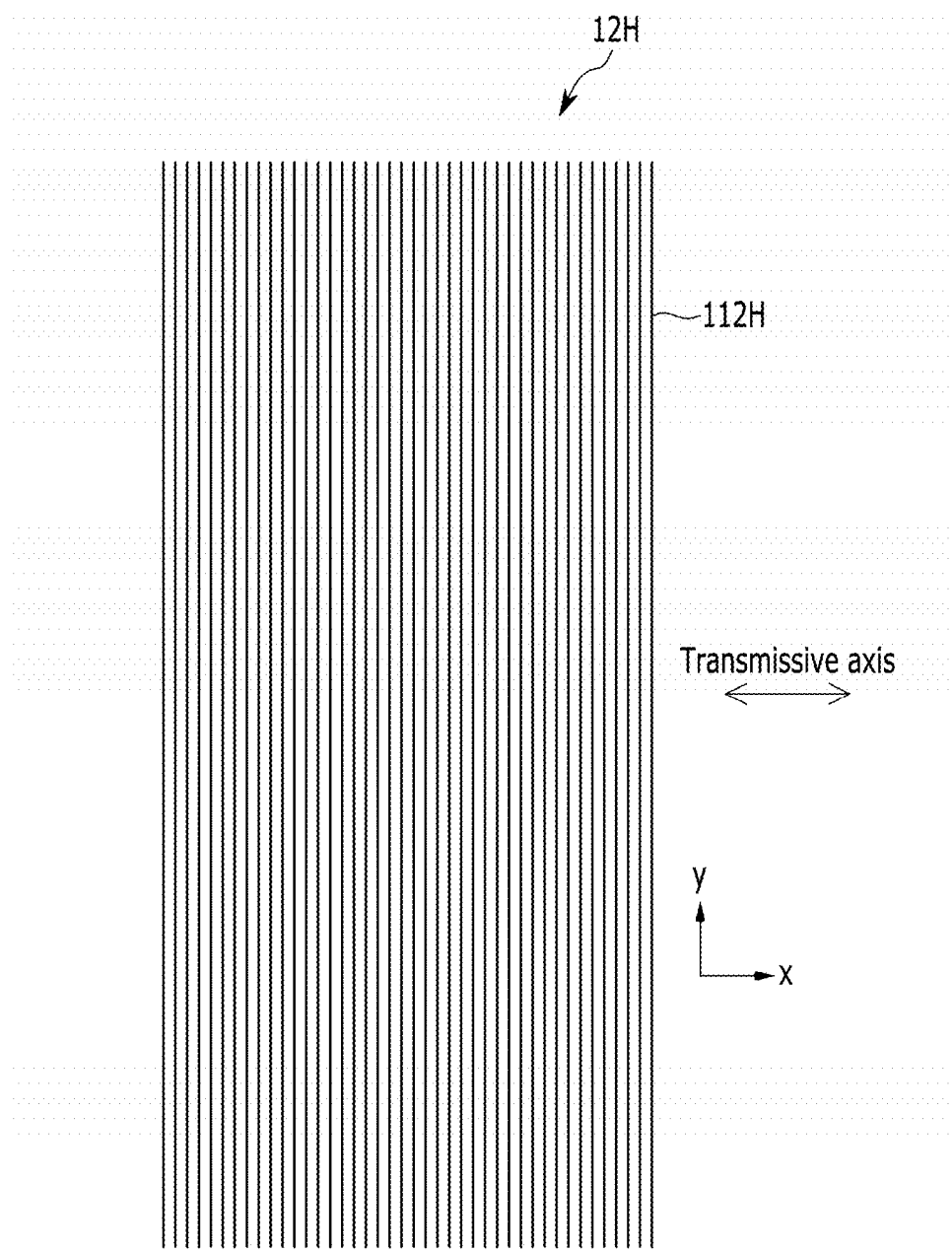
FIG. 7 is a top plan view of an exemplary embodiment of a lower polarizer facing the pixel of FIG. 6.
Figure 8:
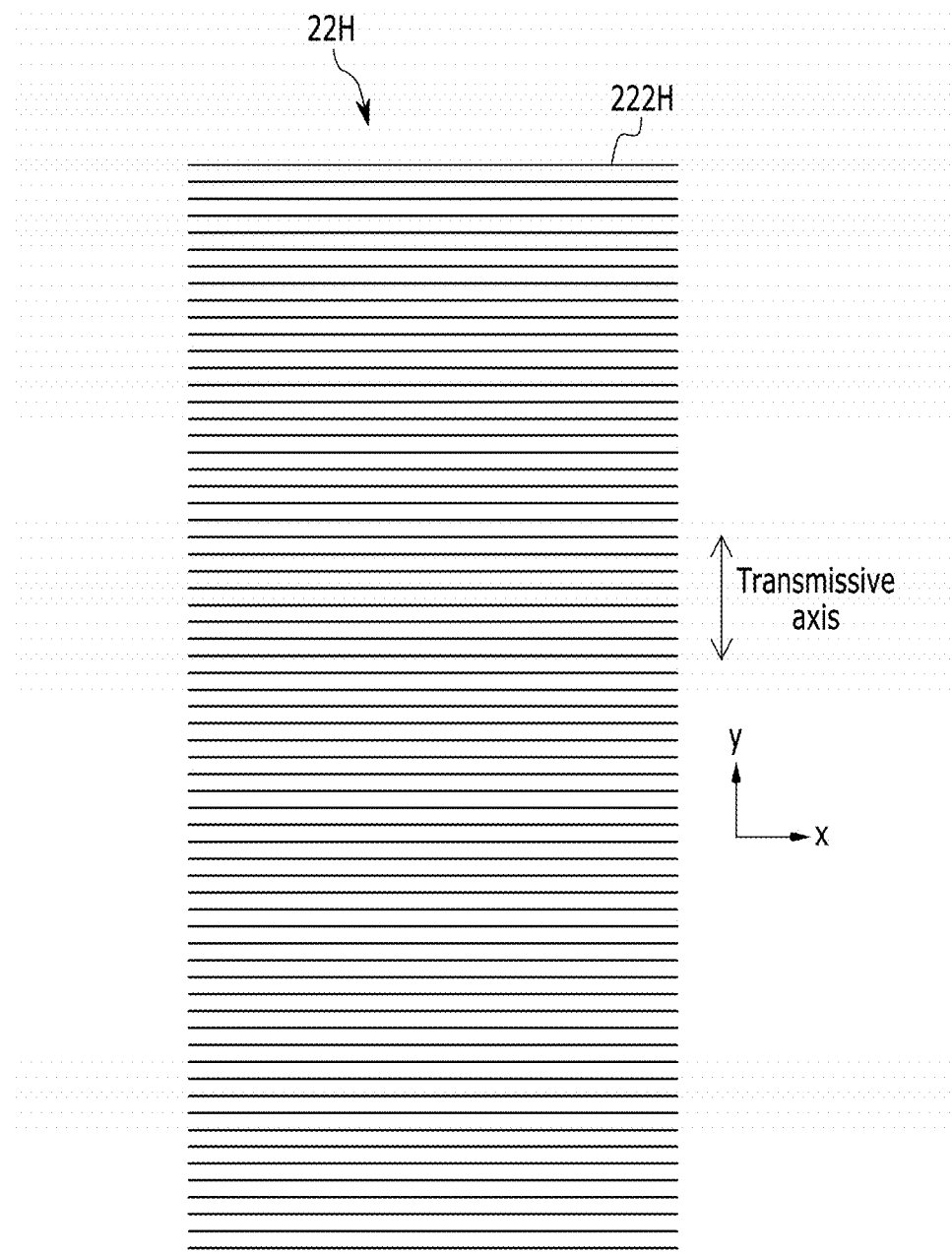
FIG. 8 is a top plan view of an exemplary embodiment of an upper polarizer facing the pixel of FIG. 6.

FIG. 1 is a block diagram showing an exemplary embodiment of a liquid crystal display according to the invention, FIG. 2 is a cross-sectional view of an exemplary embodiment of a liquid crystal display according to the invention, FIG. 3 is a top plan view of an exemplary embodiment of a field generating electrode in a pixel of a liquid crystal display, according to the invention, FIG. 4 is a top plan view of an exemplary embodiment of a lower polarizer facing the pixel of FIG. 3, FIG. 5 is a top plan view of an exemplary embodiment of an upper polarizer facing the pixel of FIG. 3, FIG. 6 is a top plan view of an exemplary embodiment of a field generating electrode in a pixel of a liquid crystal display, according to the invention, FIG. 7 is a top plan view of an exemplary embodiment of a lower polarizer facing the pixel of FIG. 6, and FIG. 8 is a top plan view of an exemplary embodiment of an upper polarizer facing the pixel of FIG. 6.

Referring to FIG. 1, an exemplary embodiment of a liquid crystal display according to the invention includes a display panel 300, and a gate driver 400 and a data driver 500 connected to the display panel 300.

In view of an equivalent circuit, the display panel 300 includes a plurality of signal lines and a plurality of pixels PX connected to the signal lines and arranged substantially in a matrix form including a plurality of pixel rows and a plurality of pixel columns, e.g., a form of an approximate diagonal matrix.

The signal lines provided on the lower panel 100 include a plurality of gate lines G1-Gn for transmitting gate signals (also referred to as "scanning signals") and a plurality of data lines D1-Dm for transmitting data voltages. The gate lines G1-Gn may extend approximately or substantially in an x direction, which is a horizontal direction or a pixel row direction, and the data lines D1-Dm may extend approximately in a y direction, which is a vertical direction or a pixel column direction.

Each pixel PX includes a switching element Q connected to a corresponding data line of the data lines D1-Dm and a corresponding data line of the gate lines G1-Gn, and a pixel electrode 191 connected to the corresponding data and gate lines.

The switching element Q may include a thin film transistor, and is controlled based on a gate signal transmitted by the corresponding gate line, thereby transmitting a data voltage transmitted by the corresponding data line to the pixel electrode 191.

In such an embodiment, each pixel PX displays one of primary colors (spatial division) or temporally alternately displays the primary colors (temporal division) to recognize a desired color as a spatial or temporal sum of the primary colors, to implement a color display.

Each pixel PX may display one image for one input image signal, and may include a plurality of subpixels representing different luminance for one input image signal. In one exemplary embodiment, for example, each pixel PX may include a first subpixel and a second subpixel, and the first subpixel and the second subpixel may display the image based on different gamma curves for a same input image signal or based on a same gamma curve. The first subpixel and the second subpixel may be applied with the data voltage through a same switching element or different switching elements. Areas of the first subpixel and the second subpixel may be equal to or different from each other.

The gate driver 400 is connected to the gate lines G1-Gn to sequentially apply gate signals including or configured by combining a gate-on voltage and a gate-off voltage to the gate lines G1-Gn.

The data driver 500 is connected to the data lines D1-Dm. The data driver 500 selects the data voltage from a plurality of grayscale voltages and applies the selected data voltage to the data lines D1-Dm. The data driver 500 may receive all grayscale voltages from a separate grayscale voltage generator (not shown), or may only receive a predetermined number of reference grayscale voltages and divide the predetermined number of reference grayscale voltages to generate grayscale voltages for all grayscale levels.

Referring to FIG. 2, an exemplary embodiment of a display panel 300 of a liquid crystal display, according to the invention, includes a lower panel 100 and an upper panel 200 disposed opposite to, e.g., facing, each other, and a liquid crystal layer 3 interposed between the lower and upper panels 100 and 200.

The lower panel 100 includes a lower substrate 110, and a plurality of pixel electrodes 191 and an opposing electrode 270 disposed on the lower substrate 110. The pixel electrode 191 and the opposed electrode 270 face each other via a passivation layer 180 interposed therebetween, and may be insulated from each other. As described above, in an exemplary embodiment, the pixel electrode 191 may be applied with the data voltage through the switching element Q and the opposing electrode 270 may be applied with a common voltage. In an exemplary embodiment, as shown in FIG. 2, the opposing electrode 270 is disposed above the pixel electrode 191. In an alternative exemplary embodiment, upper and lower positions of the pixel electrode 191 and the opposing electrode 270 may be exchanged, that is, the pixel electrode 191 may be disposed above the opposing electrode 270.

The liquid crystal layer 3 includes liquid crystal molecules 31. The liquid crystal molecules 31 of the liquid crystal layer 3 are arranged such that longitudinal axes thereof are aligned approximately parallel to a surface (e.g., an upper surface or a lower surface) of the lower substrate 110 and an upper substrate 210 in absence of an electric field. In such an embodiment, a lower alignment layer 11 may be disposed, e.g., coated, on an inner surface of the lower panel 100, and an upper alignment layer 21 may be disposed, e.g., coated, on an inner surface of the upper panel 200. The lower alignment layer 11 and the upper alignment layer 21 may be processed to align the liquid crystal molecules 31 in directions approximately perpendicular to each other.

Various methods may be used to align the lower alignment layer 11 and the upper alignment layer 21, such as a rubbing method using a photoresist ("PR"), a photo-alignment method using ultraviolet rays, and an ion-beam alignment method, for example.

The pixel electrode 191 and the opposing electrode 270, as field generating electrodes, together form an electric field to the liquid crystal layer 3 to determine a direction of the liquid crystal molecules 31 of the liquid crystal layer 3. Polarization of incident light is controlled according to the direction of the longitudinal axes of the liquid crystal molecules 31, thereby displaying a desired image. To obtain a change of the polarization of light according to the arrangement direction of the liquid crystal molecules 31 as a change of the transmittance of light, a polarizer may be included in the display panel 300.

Referring to FIG. 2, an exemplary embodiment of the display panel 300, according to the invention, may include a lower polarizer 12 included in the lower panel 100 and an upper polarizer 22 included in the upper panel 200. In an exemplary embodiment, as shown in FIG. 2, the lower polarizer 12 may be disposed between the lower substrate 110 and the pixel electrode 191, and the upper polarizer 22 may be disposed on the inner surface of the upper substrate 210, but not being limited thereto. In an alternative exemplary embodiment, the positions of the lower polarizer 12 and the upper polarizer 22 may be variously changed or modified. The lower polarizer 12 and the upper polarizer 22 may be in-cell polarizers ("ICP") formed in the display panel 300.

In an exemplary embodiment, transmissive axes of the lower polarizer 12 and the upper polarizer 22 may cross each other. In such an embodiment, the liquid crystal display may operate in a normally black mode. In such an embodiment, when the electric field is not generated to the liquid crystal layer 3, the liquid crystal display displays a black grayscale of zero (0) grayscale, and when the electric field is generated to the liquid crystal layer 3, the liquid crystal molecules 31 are rearranged, thereby displaying an image having a grayscale greater than the zero (0) grayscale. However, exemplary embodiments of the liquid crystal display are not limited to the normally black mode, and of the liquid crystal display may operate in a normally white mode.

In an exemplary embodiment, a backlight unit (not shown) for supplying light to the display panel 300 may be disposed outside the lower substrate 110.

Referring to FIG. 3 to FIG. 8, the pixels PX of an exemplary embodiment of the liquid crystal display according to the invention includes a first type pixel, e.g., a vertical slit pixel VX, and/or a second type pixel, e.g., a horizontal slit pixel HX.

Referring to FIG. 3, the vertical slit pixel VX includes the pixel electrode 191 that has substantially a plane shape, and the opposing electrode 270 including a plurality of branch electrodes 273 overlapping the pixel electrode 191. Herein, the plane shape may refer to a plane-like shape having a substantially small thickness compared to a width and/or a length thereof, e.g., a film-like shape or a plate-like shape. A slit 275, which is a space between the electrodes, is defined between the plurality of branch electrodes 273. The passivation layer 180 is disposed between the pixel electrode 191 and the opposing electrode 270 such that the pixel electrode 191 and the opposing electrode 270 may be separated or spaced apart from each other.

In an exemplary embodiment, as shown in FIG. 3, the branch electrode 273 extends approximately in a direction closer to the y direction (the vertical direction) than the x direction (the horizontal direction). In such an embodiment, an angle between the y direction and the extending direction of the branch electrode 273 is less than an angle between the x direction and the extending direction of the branch electrode 273. The upper branch electrode 273 may be inclined to a right side or left side with respect to a transverse center line CT to form an acute angle (e.g., an angle less than about 45 degrees) with the y direction, and the lower branch electrode 273 may extend to be substantially symmetrical to the upper branch electrode 273 with respect to the transverse center line CT.

The longitudinal axis of the liquid crystal molecule 31 corresponding to the vertical slit pixel VX may be aligned approximately parallel to the y direction, as shown in FIG. 3. When the electric field is generated between the pixel electrode 191 and the opposing electrode 270, in an exemplary embodiment, where a liquid crystal molecule 31 having positive dielectric anisotropy, the liquid crystal molecule 31 tends to be inclined in the direction approximately parallel to the electric field as indicated by an arrow shown in FIG. 3. Accordingly, in such an embodiment, the liquid crystal molecule 31 may have a pretilt to improve response speed.

In an alternative exemplary embodiment, the pixel electrode 191 and the opposing electrode 270 may be configured with an in-plane switching ("IPS") mode. In such an embodiment, the pixel electrode 191 and the opposing electrode 270 may include a plurality of branch electrodes (not shown) disposed in a same layer as each other and alternately disposed with each other.

Referring to FIG. 4, in an exemplary embodiment, the lower polarizer 12 includes a vertical lower polarizer 12V disposed or positioned at a region corresponding to the vertical slit pixel VX. The transmissive axis of the vertical lower polarizer 12V may be approximately parallel to the y direction. Accordingly, the light passing through the vertical lower polarizer 12V may be polarized in the direction approximately parallel to the y direction.

The vertical lower polarizer 12V may have various structures. In one exemplary embodiment, however, the vertical lower polarizer 12V may include a plurality of minute patterns 112V extending approximately in the x direction and substantially parallel to each other, as shown in FIG. 4. A minute slit is formed between the minute patterns 112V. A pitch of the minute pattern 112V may be less than about 200 nanometers (nm), but is not limited thereto. A ratio of the width of the minute pattern 112V to the width of the minute slit may be about 1:1, but not being limited thereto. Alternatively, the minute pattern 112V may form a predetermined acute angle (e.g., an angle less than about 45 degrees) with the x direction.

The vertical lower polarizer 12V may polarize the light passing therethrough in the y direction, that is, the direction perpendicular to the extending direction of the minute pattern 112V or the minute slit. That is, the minute pattern 112V and the minute slit may reflect the light parallel to the extending direction of the minute pattern 112V or the minute slit, and may transmit the light perpendicular to the extending direction of the minute pattern 112V or the minute slit.

The minute patterns 112V may be formed by various methods. In one exemplary embodiment, for example, the minute patterns 112V may be formed by patterning a metal or through a process, in which a block co-polymer coating layer is coated and then light is irradiated thereto.

Referring to FIG. 5, the upper polarizer 22 may include a vertical upper polarizer 22V disposed at a region corresponding to the vertical slit pixel VX. The transmissive axis of the vertical upper polarizer 22V may be approximately parallel to the x direction. Accordingly, the light passing through the vertical upper polarizer 22V may be polarized in the direction approximately parallel to the x direction.

The vertical lower polarizer 22V may have various structures. In one exemplary embodiment, for example, the vertical lower polarizer 22V may include a plurality of minute patterns 222V extending approximately in the y direction and substantially parallel to each other, as shown in FIG. 5. A minute slit is formed between the minute patterns 222V. A pitch of the minute pattern 222V may be less than about 200 nm, but not being limited thereto. A ratio of the width of the minute pattern 222V to the width of the minute slit may be about 1:1, but not being limited thereto.

Alternatively, the minute pattern 222V may form a predetermined acute angle (e.g., an angle less than about 45 degrees) with the y direction.

The vertical upper polarizer 22V may polarize the light in the x direction, that is, the direction perpendicular to the extending direction of the minute pattern 222V or the minute slit. That is, the minute pattern 222V and the minute slit may reflect the light parallel to the extending direction of the minute pattern 222V or the minute slit and may transmit the light perpendicular to the extending direction of the minute pattern 222V or the minute slit.

The minute pattern 222V may be formed by various methods. In one exemplary embodiment, for example, the minute pattern 222V may be formed by patterning a metal or through a process, in which a block co-polymer coating layer is coated and then light is irradiated thereto.

In an alternative exemplary embodiment, the vertical upper polarizer 22V corresponding to the vertical slit pixel VX may have the transmissive axis approximately parallel to the y direction.

Referring to FIG. 6, the horizontal slit pixel HX includes the pixel electrode 191 having substantially a plane shape and the opposing electrode 270 including a plurality of branch electrodes 273 overlapping the pixel electrode 191. A slit 275, as a space between the electrodes, is defined or formed between the plurality of branch electrodes 273. The passivation layer 180 is disposed between the pixel electrode 191 and the opposing electrode 270 such that the pixel electrode 191 and the opposing electrode 270 may be separated or spaced apart from each other.

The branch electrode 273 extends approximately in a predetermined direction closer to the x direction (the horizontal direction) than the y direction (the vertical direction). In such an embodiment, an angle between the x direction and the extending direction of the branch electrode 273 is less than an angle between the y direction and the extending direction of the branch electrode 273. The upper branch electrode 273 may be inclined with respect to a transverse center line CT to an upper side or lower side to form an acute angle (e.g., an angle less than about 45 degrees) with the x direction, and the lower branch electrode 273 may extend to be substantially symmetrical to the upper branch electrode 273 with respect to the transverse center line CT.

The longitudinal axis of the liquid crystal molecule 31 corresponding to the horizontal slit pixel HX may be aligned approximately parallel to the x direction, as shown in FIG. 6. If the electric field is formed between the pixel electrode 191 and the opposing electrode 270, in the case of the liquid crystal molecule 31 having positive dielectric anisotropy, the liquid crystal molecule 31 tends to be inclined in the direction approximately parallel to the electric field like an arrow direction shown in FIG. 6. The liquid crystal molecule 31 may have the pretilt to improve response speed.

In an alternative exemplary embodiment, the pixel electrode 191 and the opposing electrode 270 may be configured with an IPS mode. In such an embodiment, the pixel electrode 191 and the opposing electrode 270 may include a plurality of branch electrodes (not shown) disposed in a same layer as each other and alternately disposed with each other.

Referring to FIG. 7, the lower polarizer 12 includes a horizontal lower polarizer 12H disposed at a region corresponding to the horizontal slit pixel HX. The horizontal lower polarizer 12H may have the transmissive axis approximately parallel to the x direction. Accordingly, the light passing through the horizontal lower polarizer 12H may be polarized in the direction approximately parallel to the x direction.

The horizontal lower polarizer 12H may have various structures. In one exemplary embodiment, for example, the horizontal lower polarizer 12H may include a plurality of minute patterns 112H extending approximately in the y direction and substantially parallel to each other, as shown in FIG. 7. A minute slit is formed between the minute patterns 112H. A pitch of the minute pattern 112H may be less than about 200 nm, but not being limited thereto. A ratio of the width of the minute pattern 112H and the width of the minute slit may be approximately 1:1, but not being limited thereto. Alternatively, the minute pattern 112H may form a predetermined acute angle (e.g., an angle less than about 45 degrees) with the y direction.

The horizontal lower polarizer 12H may polarize the light in the x direction, that is, the direction perpendicular to the extending direction of the minute pattern 112H or the minute slit. That is, the minute pattern 112H and the minute slit may reflect the light parallel to the extending direction of the minute pattern 112H or the minute slit, and may transmit the light perpendicular to the extending direction of the minute pattern 112H or the minute slit.

The minute pattern 112H may be formed by various methods. In one exemplary embodiment, for example, the minute pattern 112H may be formed by patterning a metal or through a process, in which a block co-polymer coating layer is coated and then light is irradiated thereto.

Referring to FIG. 8, the upper polarizer 22 may include a horizontal upper polarizer 22H disposed at a region corresponding to the horizontal slit pixel HX. The horizontal upper polarizer 22H may have the transmissive axis approximately parallel to the y direction. Accordingly, the light passing through the horizontal upper polarizer 22H may be polarized in the direction approximately parallel to the y direction.

The horizontal lower polarizer 22H may have various structures. In one exemplary embodiment, for example, the horizontal lower polarizer 22H may include a plurality of minute patterns 222H extending approximately in the x direction and substantially parallel to each other, as shown in FIG. 8. A minute slit is formed between the minute patterns 222H. A pitch of the minute pattern 222H may be less than about 200 nm, but not being limited thereto. A ratio of the width of the minute pattern 222H and the width of the minute slit may be approximately 1:1, but not being limited thereto. Alternatively, the minute pattern 222H may form a predetermined acute angle (e.g., an angle less than about 45 degrees) with the y direction.

The horizontal lower polarizer 22H may polarize the light in the y direction, that is, the direction perpendicular to the extending direction of the minute pattern 222H or the minute slit. That is, the minute pattern 222H and the minute slit may reflect the light parallel to the extending direction of the minute pattern 222H or the minute slit and may transmit the light perpendicular to the extending direction of the minute pattern 222H or the minute slit.

The minute pattern 222H may be formed by various methods. In one exemplary embodiment, for example, the minute pattern 222H may be formed by patterning a metal or through a process, in which a block co-polymer coating layer is coated and then light is irradiated thereto.

In an alternative exemplary embodiment, the horizontal upper polarizer 22H corresponding to the horizontal slit pixel HX may have the transmissive axis approximately parallel to the x direction.

In an exemplary embodiment shown in FIG. 3 to FIG. 8, the structures of the pixel electrode 191 and the opposing electrode 270 corresponding to each other may be exchanged.

A mode of the liquid crystal display, in which the alignment direction of the liquid crystal molecule 31 corresponding to each pixel PX is approximately the same direction as the transmissive axis of the lower polarizer 12 corresponding to the corresponding pixel PX, is referred to as an extraordinary mode ("e-mode"), and a mode of the liquid crystal display, in which the alignment direction of the liquid crystal molecule 31 corresponding to each pixel PX is the approximately same direction as the transmissive axis of the lower polarizer 12 corresponding to the corresponding pixel PX, is referred to as an ordinary mode ("o-mode"). In an exemplary embodiment, the liquid crystal display is in the extraordinary mode, such that a variation of color coordinates according to the viewing angle is small compared to a liquid crystal display in the ordinary mode, and light leakage is small at a lateral side, thereby obtaining improved characteristics compared to the liquid crystal display in the ordinary mode.

According to an exemplary embodiment of the invention, the alignment direction of the liquid crystal molecule 31 of the vertical slit pixel VX is approximate the y direction, and the corresponding lower polarizer 12 is the vertical lower polarizer 12V such that the vertical slit pixel VX of the liquid crystal display operates in the extraordinary mode, and the alignment direction of the liquid crystal molecule 31 of the horizontal slit pixel HX is approximate the x direction and the corresponding lower polarizer 12 is the horizontal lower polarizer 12H such that the horizontal slit pixel HX of the liquid crystal display operates in the extraordinary mode. Accordingly, in such an embodiment, the entire pixel PX may operate in the extraordinary mode. Therefore, the color coordinate variation according to the viewing angle of such an embodiment of the liquid crystal display according to the invention may be further reduced and the light leakage may be further reduced in the lateral side.

Next, a structure of exemplary embodiments of the liquid crystal display according to the invention will be described with reference to FIG. 9 and FIG. 10.

Figure 9:
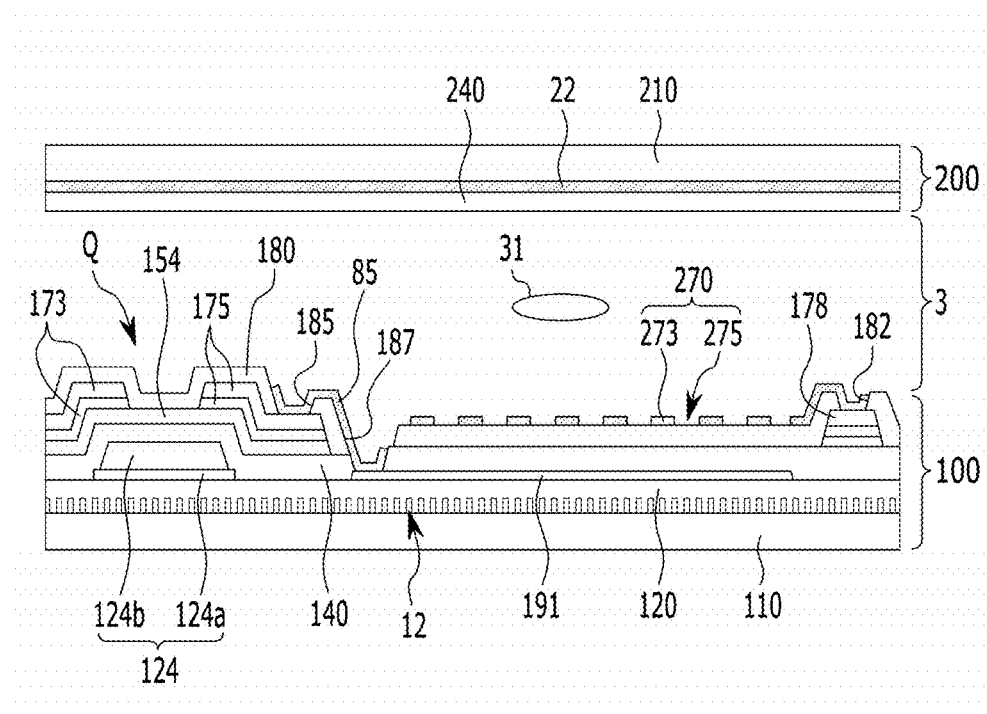
FIG. 9 and FIG. 10 are cross-sectional views of exemplary embodiments of a liquid crystal display according to the invention.
Figure 10:
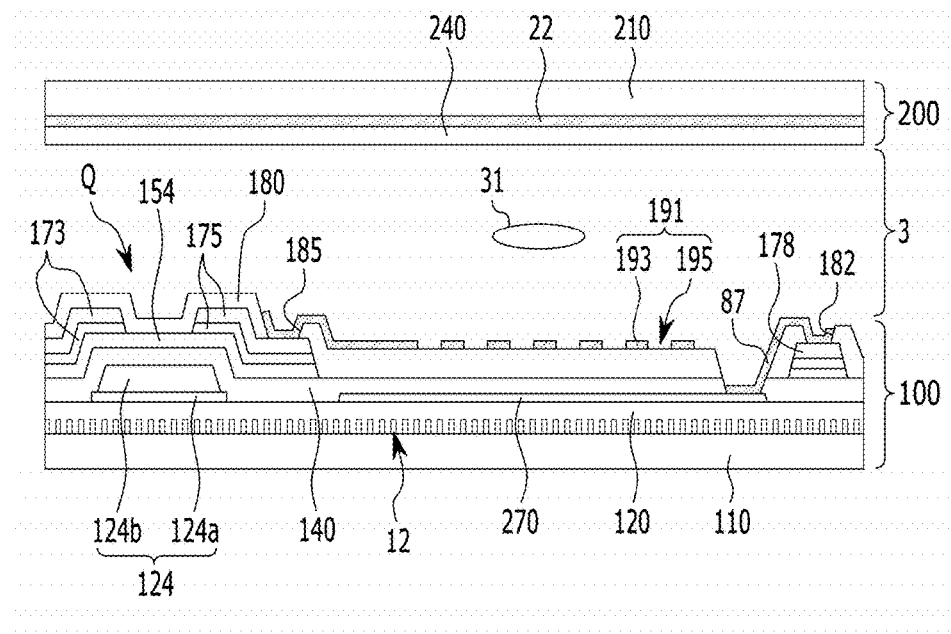

FIG. 9 and FIG. 10 are cross-sectional views of exemplary embodiments of a liquid crystal display, according to the invention.

Firstly, referring to FIG. 9, an exemplary embodiment of a liquid crystal display includes the lower panel 100 and the upper panel 200 facing each other, and the liquid crystal layer 3 interposed therebetween.

Referring to the lower panel 100, the lower polarizer 12 is disposed on the lower substrate 110. The structure of the lower polarizer 12 is substantially the same as the exemplary embodiments thereof described above, and any repetitive detailed description thereof will be omitted.

A buffer layer 120 including an insulating material may be disposed on the lower polarizer 12.

A gate conductor including a gate line (not shown) including a gate electrode 124 and a pixel electrode 191 may be disposed on the buffer layer 120.

The gate line transmits a gate signal and may extend approximately parallel to the x direction of the horizontal direction. The gate electrode 124 may have a single layer structure or a multilayer structure. In one exemplary embodiment, for example, the gate electrode 124 may have a multilayer structure including a lower layer 124a and an upper layer 124b, as shown in FIG. 9.

The pixel electrode 191 having an approximate plane shape may include a transparent conductive material such as indium tin oxide ("ITO") and indium zinc oxide ("IZO").

A gate insulating layer 140 including an inorganic insulator such as a silicon nitride ($SiN_x$) or a silicon oxide ($SiO_x$), for example, is disposed on the gate electrode 124 and the pixel electrode 191.

A semiconductor 154 is disposed on the gate insulating layer 140. The semiconductor 154 may include amorphous silicon, polysilicon, an oxide semiconductor or a combination thereof, for example.

A data conductor including a data line (not shown) including a source electrode 173, a drain electrode 175 and a common voltage line 178 is disposed on the semiconductor 154.

The data line transmits the data signal and extends substantially in the y direction (the vertical direction), thereby intersecting the gate line. The drain electrode 175 faces the source electrode 173.

The data conductor may include or be made of a refractory metal such as molybdenum, chromium, tantalum, and titanium, or an alloy thereof, and the data conductor (e.g., the source electrode 173 and the drain electrode 175 shown in FIG. 9) may have a multilayered structure including a refractory metal layer (not illustrated) and a low resistive conductive layer (not illustrated).

An ohmic contact (not shown) including a material such as n+ hydrogenated amorphous silicon, which is highly doped with an n-type impurity such as phosphorous (P), or a silicide, may be further disposed between the semiconductor 154 and the data conductor.

The gate electrode 124, the source electrode 173 and the drain electrode 175 collectively defines a thin film transistor of a switching element Q along with the semiconductor 154, and a channel of the thin film transistor is formed in the semiconductor 154 between the source electrode 173 and the drain electrode 175.

A passivation layer 180 is disposed on the switching element Q. The passivation layer 180 may include or be made of an organic insulating material or an inorganic insulating material.

A contact hole 182 that exposes the common voltage line 178 may be defined through the passivation layer 180. A contact hole 187 that exposes the pixel electrode 191 may be defined through the passivation layer 180 and the gate insulating layer 140.

The opposing electrode 270 and contact assistants 85 may be disposed on the passivation layer 180.

The opposing electrode 270 may include a plurality of branch electrodes 273 overlapping the pixel electrode 191 and slits 275 defined therebetween. The opposing electrode 270 is physically and electrically connected to the common voltage line 178 through the contact hole 182 that exposes the common voltage line 178 to receive a common voltage. The opposing electrode 270 may include or be made of the transparent conductive material such as ITO or IZO.

The contact assistant 85 is physically and electrically connected to the drain electrode 175 and the pixel electrode 191 through the contact holes 185 and 187 defined through the passivation layer 180 to expose the drain electrode 175 and the pixel electrode 191. The pixel electrode 191 may be applied with the data voltage from the switching element Q through the contact assistant 85.

Referring to the upper panel 200, the upper polarizer 22 is disposed on the upper substrate 210. The structure of the upper polarizer 22 is substantially the same as the exemplary embodiments thereof described above, and any repetitive detailed description thereof will be omitted.

An overcoat 240 including an insulating material may be further disposed on the upper polarizer 22.

The lower panel 100 or the upper panel 200 may further include a color filter (not shown). The color filter may each display one of primary colors, for example, three primary colors of red, green and blue, three primary colors of yellow, cyan and magenta, or four primary colors.

The liquid crystal layer 3 includes liquid crystal molecules 31 having dielectric anisotropy. In an exemplary embodiment, the liquid crystal molecules 31 may be aligned so that longitudinal axes thereof are parallel to the panels 100 and 200 when an electric field is not applied to the liquid crystal layer 3, and in such an embodiment, the liquid crystal molecules may have positive dielectric anisotropy. According to another exemplary embodiment of the invention, the liquid crystal molecules 31 may be nematic liquid crystal molecules, a longitudinal-axis direction of which is spirally twisted up to the upper panel 200 from the lower panel 100.

When the pixel electrode 191 is applied with the data voltage through the switching element Q, and the opposing electrode 270 is applied with the common voltage, the electric field is generated to the liquid crystal layer 3 and the liquid crystal molecules 31 are rearranged. The polarization of the light passing through the liquid crystal layer 3 through the rearranged liquid crystal molecule 31 is changed, thereby displaying an image of a desired luminance. In an exemplary embodiment, the branch electrodes 273 of the opposing electrode 270 form a fringe field to the liquid crystal layer 3 along with the pixel electrode 191, thereby determining the arrangement direction of the liquid crystal molecules 31.

Referring to FIG. 10, an alternative exemplary embodiment of the liquid crystal display is substantially the same as the exemplary embodiment shown in FIG. 9, except that the deposition position and the structure of the pixel electrode 191 and the opposing electrode 270. According to an exemplary embodiment, as shown in FIG. 10, the opposing electrode 270 may be disposed under the pixel electrode 191, for example, in a same layer as the gate electrode 124, and the pixel electrode 191 may be disposed on the opposing electrode 270, for example, on the passivation layer 180. In such an embodiment, the opposing electrode 270 corresponding to each pixel PX has the plane shape, and the pixel electrode 191 may be include a plurality of branch electrodes 193 facing the opposing electrode 270 and slits 195 defined therebetween.

In such an embodiment, the opposing electrode 270 may be applied with the common voltage from the common voltage line 178 through the contact hole 182 that exposes the common voltage line 178 and contact assistants 87. The pixel electrode 191 may be directly connected to the drain electrode 175 through the contact hole 185 defined through the passivation layer 180 to expose the drain electrode 175 without separate contact assistants.

Next, exemplary embodiments of a liquid crystal display according to the invention will be described with further reference to FIG. 11 and FIG. 12.

Figure 11:
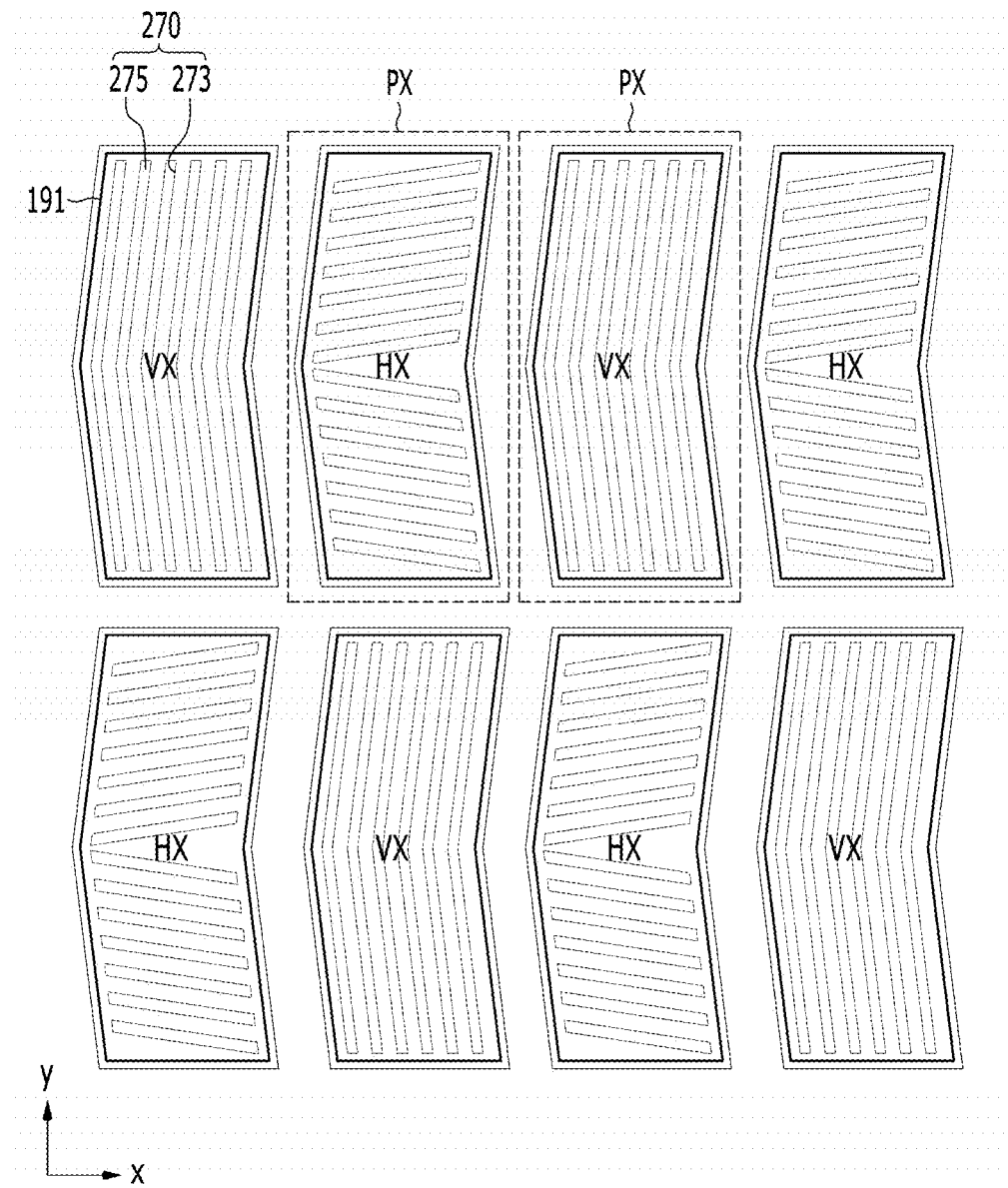
FIG. 11 and FIG. 12 are layout views of a plurality of pixels of exemplary embodiments of a liquid crystal display, according to the invention.
Figure 12:
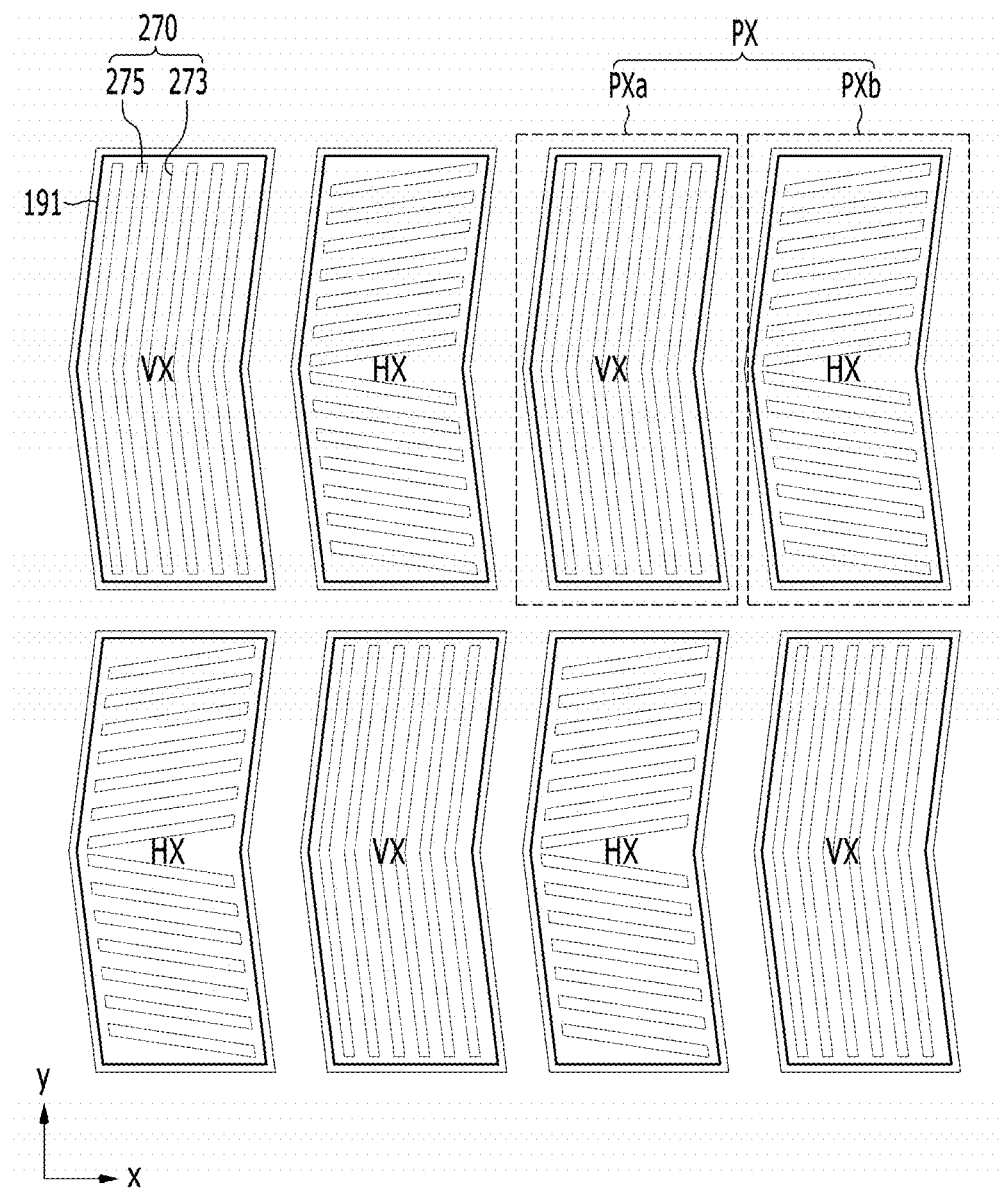

FIG. 11 and FIG. 12 are layout views of a plurality of pixels of exemplary embodiments of a liquid crystal display, according to the invention.

Referring to FIG. 11, in an exemplary embodiment, the pixel PX included in the liquid crystal display may be one of the vertical slit pixel VX and the horizontal slit pixel HX. In an exemplary embodiment, as shown in FIG. 11, the pixels PX of the liquid crystal display include the vertical slit pixel VX and the horizontal slit pixel HX that are alternately and periodically disposed in the x direction (the horizontal direction or the pixel row direction) and/or the y direction (the vertical direction or the pixel column direction). In one exemplary embodiment, for example, the vertical slit pixel VX and the horizontal slit pixel HX are alternately disposed in the x direction and the y direction for one pixel PX, as shown in FIG. 11, but the invention is not limited thereto.

In an alternative exemplary embodiment, two or more vertical slit pixels VX and two or more horizontal slit pixels HX may be alternately disposed in at least one direction of the x direction and the y direction. Accordingly, in such an embodiment, a vertical slit pixel VX and a horizontal slit pixel HX may be adjacent to each other in a diagonal direction along the x direction.

In an alternative exemplary embodiment, as shown in FIG. 11, the opposing electrode 270 includes a plurality of branch electrodes 273 and slits 275 and the pixel electrode 191 has substantially a plane shape, and alternatively, the pixel electrode 191 may include a plurality of branch electrodes and slits defined therebetween, and the opposing electrode 270 may have substantially a plane shape.

Referring to FIG. 12, an alternative exemplary embodiment of the pixel PX included in the liquid crystal display may include a plurality of subpixels including a vertical slit pixel VX and a horizontal slit pixel HX. In one exemplary embodiment, for example, each pixel PX includes a first subpixel PXa corresponding to the vertical slit pixel VX and a second subpixel PXb corresponding to the horizontal slit pixel HX, as shown in FIG. 12. In such an embodiment, the first and second subpixels PXa and PXb or the vertical and horizontal slit pixels VX HX may be adjacent to each other in the x direction or the y direction.

In an alternative exemplary embodiment, each pixel PX may include a plurality of first subpixels, each corresponding to the vertical slit pixel VX or a plurality of second subpixels, each corresponding to the horizontal slit pixel HX.

As described above, in such an embodiment, where the pixel PX includes subpixels corresponding to a vertical slit pixel VX and a horizontal slit pixel HX, each vertical slit pixel VX or each horizontal slit pixel HX may define a subpixel of the pixel. In such an embodiment, as described above, the subpixel may include the first subpixel PXa and the second subpixel PXb for displaying images of different luminance according to independent gamma curves for one input image signal, that is, a same input image signal. In an exemplary embodiment, as shown in FIG. 12, the vertical slit pixel VX of a pixel PX may define the first subpixel PXa of the pixel PX, and the horizontal slit pixel HX of the pixel PX may define the second subpixel PXb of the pixel PX, but the invention is not limited thereto. In an alternative exemplary embodiment, the number of the vertical slit pixel VX or the horizontal slit pixel HX included in each subpixel PXa and PXb may be changed or variously modified.

In an exemplary embodiment, the vertical slit pixel VX and the horizontal slit pixel HX may be alternately disposed in a pixel PX in the x direction and/or the y direction.

Next, an exemplary embodiment of a liquid crystal display according to the invention will be described with further reference to FIG. 13 to FIG. 15.

Figure 13:
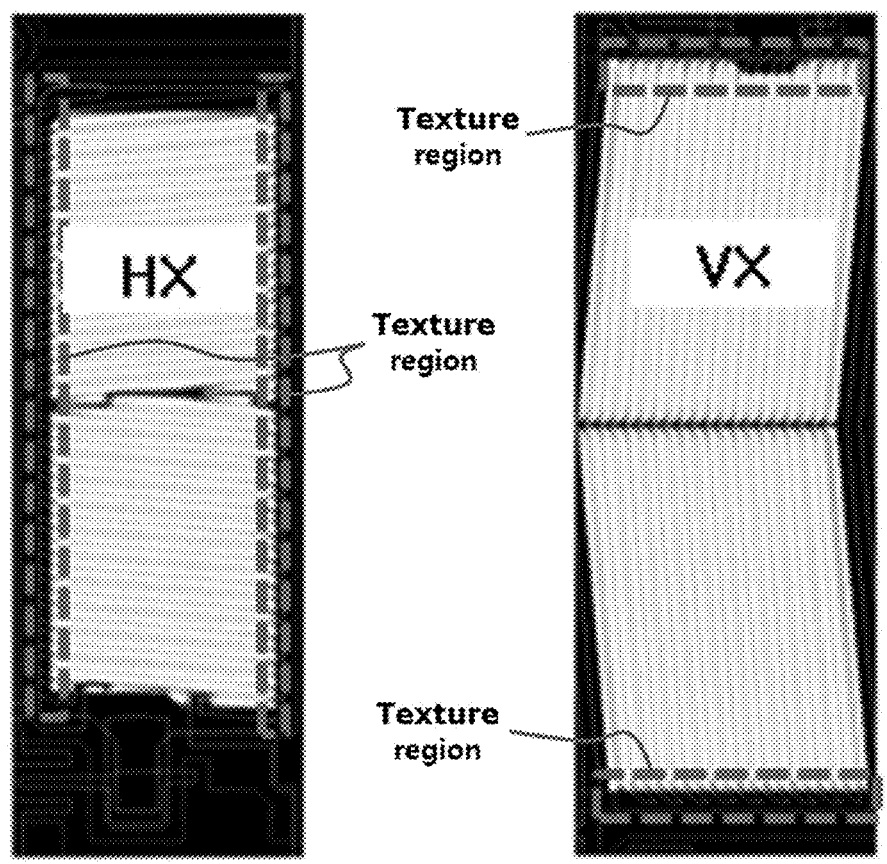
FIG. 13 is an image showing a simulation result of a texture generation region according to a structure of a field generating electrode of an exemplary embodiment of a liquid crystal display, according to the invention.
Figure 14:
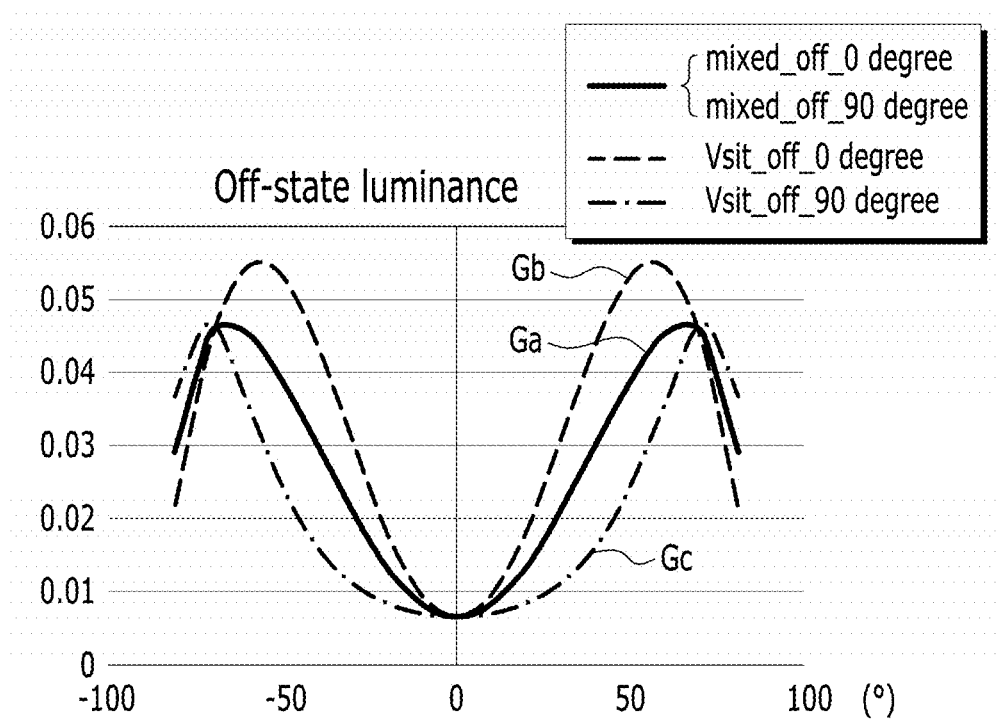
FIG. 14 is a graph showing luminance in an off-state according to a viewing angle of an exemplary embodiment of a liquid crystal display according to the invention, and luminance in an off-state according to a viewing angle of a liquid crystal display according to a conventional art.
Figure 15:
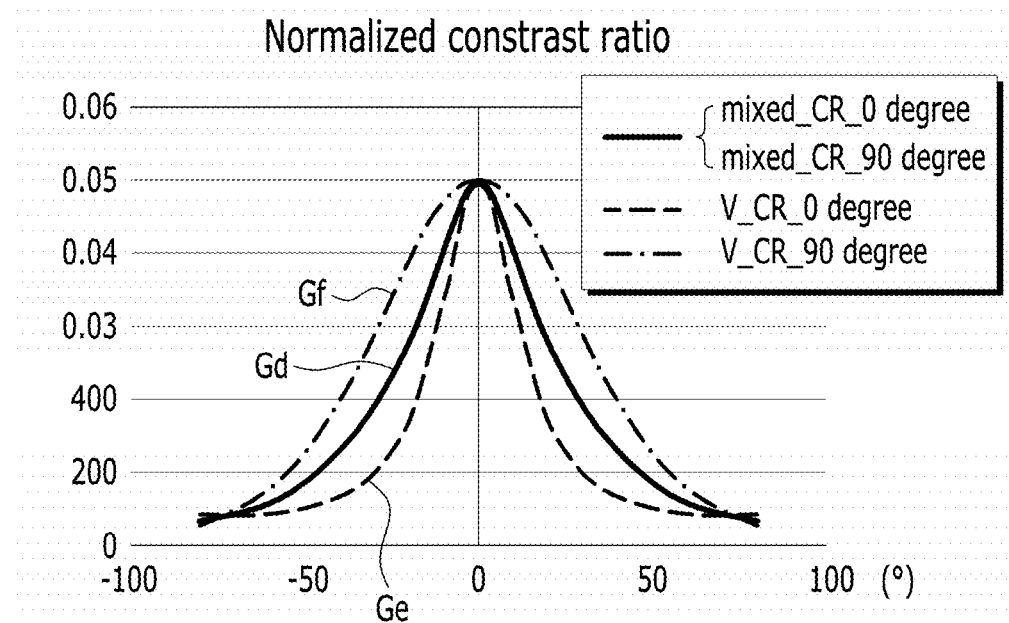
FIG. 15 is a graph showing a contrast ratio according to a viewing angle of an exemplary embodiment of a liquid crystal display according to the invention, and a contrast ratio according to a viewing angle of a liquid crystal display according to a conventional art.

FIG. 13 is an image showing a simulation result of a texture generation region according to a structure of a field generating electrode of an exemplary embodiment of a liquid crystal display according to the invention, FIG. 14 is a graph showing luminance of an off-state according to a viewing angle of an exemplary embodiment of a liquid crystal display according to the invention, and luminance of an off-state according to a viewing angle of a liquid crystal display according to a conventional art, and FIG. 15 is a graph normalizing a contrast ratio according to a viewing angle of an exemplary embodiment of a liquid crystal display according to the invention, and a contrast ratio according to a viewing angle of a liquid crystal display according to a conventional art at 1000:1.

Firstly, referring to FIG. 13, in an exemplary embodiment where the vertical direction length of each pixel PX is longer than the horizontal direction length, the branch electrodes in the horizontal slit pixel HX extend substantially in the horizontal direction such that texture, in which the direction of the liquid crystal molecule 31 is not controlled, is formed long in the vertical direction. In such an embodiment, the branch electrodes in the vertical slit pixel VX extend substantially in the vertical direction such that the texture, in which the direction of the liquid crystal molecule 31 is not controlled, is mainly formed in the horizontal direction and the texture region is smaller than the horizontal slit pixel HX.

Accordingly, the vertical slit pixel VX may increase the transmittance of the liquid crystal display.

However, in a conventional liquid crystal display where all pixels PX of the display panel 300 consist of the vertical slit pixels VX, the viewing angle characteristic of an axis with an azimuthal angle of zero (0) degree may be deteriorated compared to the viewing angle characteristic with an azimuthal angle of 90 degrees. Here, the axis with the azimuthal angle of zero (0) degrees means an axis at which the viewing angle is changed in the x direction (the horizontal direction), and the axis with the azimuthal angle is 90 degrees means an axis at which the viewing angle is changed in the y direction (the vertical direction).

In an exemplary embodiment, referring to FIG. 14, lateral light leakage of a black grayscale of the conventional liquid crystal display at the axis where the azimuthal angle is zero 0 degree is represented by a curve Gb, and the light leakage of the black grayscale of the conventional liquid crystal display at the axis where the azimuthal angle is 90 degrees is represented by a curve Gc. Accordingly, as shown in FIG. 14, the lateral light leakage of the black grayscale at the axis where the azimuthal angle is zero (0) degree is approximately larger than the lateral light leakage of the black grayscale at the axis where the azimuthal angle is 90 degrees because retardation due to the viewing angle characteristic at the axis where the azimuthal angle is zero (0) degree measured while being rotated in a short axis direction of the liquid crystal molecule 31 in the vertical slit pixel VX is larger than at the axis where the case that the azimuthal angle is 90 degrees such that the light leakage in the black grayscale may be increased.

Accordingly, as shown in FIG. 15, the characteristic of the contrast ratio according to the viewing angle at the axis where the azimuthal angle is zero (0) degree is lower than the contrast ratio according to the viewing angle where the azimuthal angle is 90 degrees. Referring to FIG. 15, the curve Ge of the contrast ratio at the axis where the azimuthal angle is zero (0) degree is lower than the curve Gf of the contrast ratio according to the viewing angle at the axis where the azimuthal angle is 90 degrees as the viewing angle is increased.

In a case of using the liquid crystal display as a monitor, when considering a viewing of the user that is mainly moved in the horizontal direction, display quality of the monitor may be improved by improving the characteristic of the viewing angle at the axis where the azimuthal angle is zero 0 degree.

According to an exemplary embodiment of the invention, the vertical slit pixel VX and the horizontal slit pixel HX are periodically disposed in the horizontal direction and/or the vertical direction such that the lateral light leakage of the black grayscale at the axis of the azimuthal angle of zero (0) degree and the lateral light leakage of the black grayscale of the azimuthal angle of 90 degrees in such an embodiment of the liquid crystal display are represented substantially the same as the curve Ga of FIG. 14, and by the lateral light leakage of an approximate average of the curve Gb of the lateral light leakage of the black grayscale of the conventional liquid crystal display including only the vertical slit pixel VX at the axis of the azimuthal angle of zero (0) degree, and the curve Gc of the lateral light leakage of the black grayscale of the conventional liquid crystal display including only the vertical slit pixel VX at the axis of the azimuthal angle of 90 degrees.

Accordingly, the contrast ratio according to the viewing angle at the axis of the azimuthal angle of zero (0) degree and the contrast ratio according to the viewing angle at the axis of the azimuthal angle of 90 degrees in such an embodiment of the liquid crystal display are also represented substantially the same as the curve Gd shown in FIG. 15, and by the contrast ratio characteristic of an approximate average of the curve Ge of the contrast ratio of the conventional liquid crystal display including only the vertical slit pixel VX according to the viewing angle at the axis of the azimuthal angle of zero (0) degree and the curve Gf of the contrast ratio of the conventional liquid crystal display including only the vertical slit pixel VX according to the viewing angle at the axis of the azimuthal angle of 90 degrees.

Accordingly, in an exemplary embodiment of the liquid crystal display according to the invention, may have an improved viewing angle characteristic compared with a conventional liquid crystal display including only the vertical slit pixel VX, and may have higher transmittance than a conventional liquid crystal display including only the horizontal slit pixels HX.

Also, in such an embodiment, as described above, the lower polarizer 12 has the transmissive axis in approximately the same direction as the alignment direction for the liquid crystal molecule 31 for the vertical slit pixel VX and the horizontal slit pixel HX such that all pixels PX operate in the extraordinary mode, and the color coordinate variation according to the viewing angle and the light leakage are thereby further decreased.

While the invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:
1. A liquid crystal display comprising:
  a plurality of pixels comprising a first type pixel and a second type pixel that are adjacent to each other in a first direction; and
  a lower polarizer,
  wherein
  the first type pixel comprises:
    a first electrode having a plane shape; and
    a second electrode including a plurality of first branches spaced apart from each other by a first slit and overlapping the first electrode,
  the second type pixel comprises:

a third electrode having a plane shape; and
a fourth electrode including a plurality of second branches spaced apart from each other by a second slit and overlapping the third electrode,
an extending direction of the first branch forms a first angle with the first direction, and forms a second angle with a second direction perpendicular to the first direction, and the first angle is greater than the second angle,
an extending direction of the second branch forms a third angle with the first direction, and forms a fourth angle with the second direction, and the third angle is less than the fourth angle, and
wherein the lower polarizer comprises:
a first lower polarizer overlapping the first type pixel and having a transmissive axis substantially parallel to the second direction; and
a second lower polarizer overlapping the second type pixel and having a transmissive axis substantially parallel to the first direction, and
wherein the first lower polarizer and the second lower polarizer define a same layer of the lower polarizer.

2. The liquid crystal display of claim 1, further comprising:
an upper polarizer; and
liquid crystal molecules disposed between the lower polarizer and the upper polarizer.

3. The liquid crystal display of claim 2, wherein
the first lower polarizer comprises a plurality of minute patterns extending substantially in the first direction, and
the second lower polarizer comprises a plurality of minute patterns extending substantially in the second direction.

4. The liquid crystal display of claim 3, further comprising:
a first substrate and a second substrate opposing each other via the liquid crystal molecules,
wherein each of the first lower polarizer and the second lower polarizer are disposed on or under the first substrate.

5. The liquid crystal display of claim 4,
wherein the first, second third and fourth electrodes are disposed on the first substrate.

6. The liquid crystal display of claim 5, wherein the upper polarizer comprises:
a first upper polarizer overlapping the first type pixel and having a transmissive axis substantially parallel to the first direction; and
a second upper polarizer overlapping the second type pixel and having a transmissive axis substantially parallel to the second direction.

7. The liquid crystal display of claim 1, wherein
the first type pixel and the second type pixel are alternately arranged in at least one direction of the first direction and the second direction.

8. The liquid crystal display of claim 1, wherein
each of the plurality of pixels receives an input signal and displays an image corresponding to the input image signal,
each pixel of the plurality of pixels comprises the first type pixel and the second type pixel as first and second subpixels of the each pixel, and
the first and second subpixels receive data voltages corresponding to a same input signal as each other.

9. The liquid crystal display of claim 8, wherein
the first type pixel and the second type pixel of the each pixel displays images corresponding to the same input signal based on different gamma curves from each other.

* * * * *